United States Patent [19]

Conger

[11] 4,141,825
[45] Feb. 27, 1979

[54] DESALINATION PROCESS SYSTEM AND BY-PRODUCT RECOVERY

[75] Inventor: Franklin E. Conger, Summit, N.J.

[73] Assignee: Stone & Webster Engineering Corporation, Boston, Mass.

[21] Appl. No.: 846,779

[22] Filed: Oct. 31, 1977

[51] Int. Cl.² .............................................. B01D 13/00
[52] U.S. Cl. .................................. 210/23 H; 210/259; 210/433 M
[58] Field of Search ...................... 210/23 H, 259, 433; 204/186

[56] References Cited

U.S. PATENT DOCUMENTS

| 2,383,234 | 8/1945 | Barnes | 202/234 |
| 3,654,148 | 4/1972 | Bradley | 210/23 H |

FOREIGN PATENT DOCUMENTS

| 50-75988 | 6/1975 | Japan | 210/23 H |
| 51-67271 | 6/1976 | Japan | 210/23 H |

OTHER PUBLICATIONS

Messing, "Combined Recovery of Potable Water and Sea Salt by Evaporation an Economic Solution," from *First International Symposium on Water Desalination,* Held Oct. 3-9, 1965 in Washington, D.C.

Primary Examiner—Frank A. Spear, Jr.

[57] ABSTRACT

A desalination process system combining electro-dialysis, reverse osmosis and brine concentration with by-product recovery.

4 Claims, 2 Drawing Figures

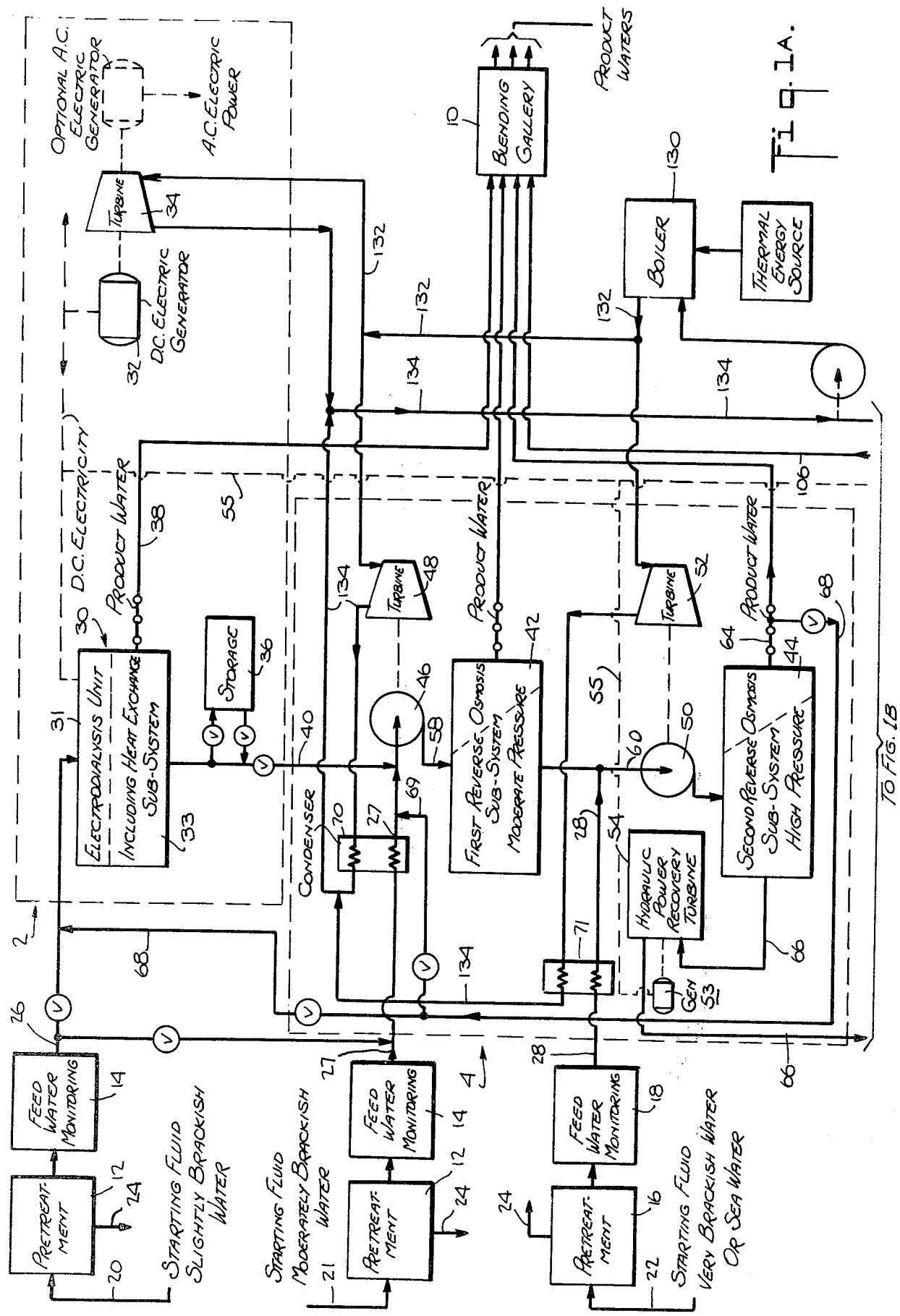

DESALINATION PROCESS SYSTEM AND BY-PRODUCT RECOVERY

CROSS REFERENCE TO RELATED APPLICATION

This application is related to Ser. No. 704,359 filed July 12, 1976 entitled "Desalination Process System and By-product Recovery" by Franklin E. Conger, now U.S. Pat. No. 4,083,781 because both are directed to desalinating fluids and recovering usable by-products in addition to potable water.

FIELD OF THE INVENTION

The invention is directed to separation of the components of aqueous mixtures, especially the removal of salts from fluids. In particular, this invention is especially suitable for desalting sea water and brackish water. More specifically, the process is directed to using electrodialysis, reverse osmosis and brine concentration desalination methods in series to produce potable product water and to obtain useful materials from the desalination by-products.

BACKGROUND OF THE INVENTION

Description of the Prior Art

The desire to separate, at acceptable cost, the components of brackish water and of sea water has existed for many years. Considerable technology now exists which is capable of purifying brackish water, sea water and other saline water.

One known technique of desalination is the electrodialysis process in which the ions forming the salt are pulled by electric forces from the saline water through membranes and thereafter concentrated in separate compartments. Another known technique of desalination is the reverse osmosis process which relies on the use of high pressure to force relatively salt-free water through membranes thereby separating relatively salt-free water from the initial saline water. In addition, brine concentrators, such as Resources Conservation Company brine concentrators (R.C.C. brine concentrators) are used to separate water and salt. In addition, solar ponds (both non-covered and covered) and molten salt systems are known methods of separating components of aqueous mixtures.

Each of these techniques relies on energy to provide the means for separating the water from the salt. For example, in the electrodialysis process, the ions forming the salt are "pulled out" of the saline water by electric forces and concentrated in separate compartments. In general, the higher the salinity of the saline water, the greater the amount of electric energy needed for this process per unit of fresh water product. Generally, at very high salt concentrations conventional electrodialysis should not be employed. For example, with some reverse osmosis membranes it is possible to obtain from saline water a reasonable yield of product water containing less than 500 ppm of dissolved salts. The salts contained in the saline water are substantially rejected by the membrane and are concentrated in a reject brine. The reverse osmosis process necessarily requires energy. The amount of energy required and the yield of product water produced from saline water are directly related to the salt concentration of the saline water being processed and, within limits, to the temperature of the saline water. In general, reverse osmosis units operate less efficiently and require more energy per unit of water product as the salt concentration of the saline water feed increases. In fact, at very high salt concentrations reverse osmosis should not be employed.

On the other hand, mechanical energy is applied to produce distilled water from saline water or brine in vapor compression units such as, for example, the R.C.C. brine concentrators which inherently produce distilled water of very high quality, that is, essentially salt-free water. However, some vapor compression units can process saline water of higher salt content than can be economically processed by electrodialysis or by reverse osmosis.

The practice of recovering various salts by the evaporation of sea water using solar energy and shallow ponds is well known and is centuries old. Solar stills are still used.

Efforts have been made to combine desalination systems and rely on combinations of desalination processes to make an efficient and economically acceptable system. One such system is shown in U.S. Pat. No. 3,632,505 (Nelson) issued Jan. 4, 1972. The system disclosed therein relies basically on arranging reverse osmosis and flash evaporation units essentially in parallel. High-pressure steam turbines provide the pressure for the reverse osmosis system and the high-pressure turbine discharge is used to provide the heat for the evaporation units.

Attempts have also been made to recover by-products from the desalination of brackish water. As set forth in the Fourth International Symposium on Salt — Northern Ohio Geological Society, a process is outlined for the partial deionization of brine to produce by-products such as sodium carbonate and calcium chloride and waste such as calcium sulfate, calcium carbonate and magnesium oxide.

The combination of generation of electric power (for example, by a nuclear power plant) and desalting water has previously been proposed and studied; such plants are sometimes called "dual purpose plants." The general concept of these previously proposed dual-purpose plants is that a portion of the heat that remains in the steam after the steam drives and passes through a steam turbine (to generate electricity) is used as the heat source for a conventional saline water distillation conversion process.

Terminology

The term "aqueous mixtures" includes the terms "saline fluids" and "saline water" and "salt water" and "brine" and "aqueous mixtures" which terms are used herein in a broad sense to denote the entire range of salt-fluid combinations including, but not limited to, sodium chloride-containing solutions, aqueous solutions of dissolved mineral salts, for example, halides, carbonates and sulfates of sodium, potassium, lithium, calcium, magnesium, bromine, zinc and copper, solutions of other salts, and solutions of combinations or mixtures of salts, and combinations or mixtures of fluids and salts and materials whether or not dissolved.

For the purposes of this patent application, the term "desalination" shall be understood to include (a) separation of the components of aqueous mixtures, (b) removal of materials from aqueous mixtures, (c) separation of components from each other in aqueous mixtures, and (d) the generally understood meaning of the term desalination, namely, the production of fresh water from saline water.

"Brackish water" generally means water having more than 500 ppm of salt but less salt than sea water. As used in this specification, "slightly brackish water" means water having 500 ppm up to 3,000 ppm of salt. "Moderately brackish water" is used herein to mean water having 3,000 ppm up to 7,500 ppm of salt. "Very brackish water" is used herein to mean water having over 7,500 ppm but less than 34,000 ppm salt. "Sea water" as used herein means water having 34,000 to 36,000 ppm.

The meaning of other terms of art used herein will be apparent from the usage.

SUMMARY OF THE INVENTION

The present invention is directed to the desalinating of brackish or sea water by electrodialysis and reverse osmosis with the simultaneous production of useful by-products.

Further, the process of the present invention facilitates the production of product water and by-products in a manner which reduces the amount of energy required.

The process system of the present invention relies essentially on an electrodialysis installation in series (including recycle) with a reverse osmosis installation and with one or more brine concentrator methods and also with by-product recovery systems.

The system of this invention processes pretreated brackish water in an electrodialysis subsystem to produce (a) product water and (b) moderately saline water of higher salt content than the entering brackish water. The moderately saline water is then processed in a reverse osmosis subsystem to produce (c) product water (d) brackish water and (e) brine. The brine is processed in brine concentration/by-product subsystems consisting of mechanical brine concentrators such as R.C.C. and solar ponds and molten salt units to produce distilled product water, by-products and discard.

The system processes a higher saline content solution, i.e. sea water or very brackish water by passage first through the reverse osmosis subsystem to produce (j) product water, (k) brackish water and (l) brine. The (k) brackish water is then processed in the electrodialysis subsystem to produce (m) product water and (n) moderately saline water which is recycled to the reverse osmosis subsystem. The above brine is processed in brine concentration/by-product subsystems to produce (p) distilled product water, (q) by-products and (r) discard.

R.C.C. type brine concentrators process the brine to produce distilled water by removing water from the brine and recovering calcium sulfate, sodium chloride and other products.

Portions of the above sodium chloride are dissolved in some of the above distilled water (from the above brine concentrators) in a NaCl brine electrolysis subsystem and the resulting brine is subjected to electrolysis thereby producing additional by-products, namely, chlorine, sodium hydroxide and hydrogen.

The sodium chloride, distilled water and low-pressure steam from the system are directed to a Solvay process subsystem. Hydrogen from the electrolysis system, together with nitrogen, are brought together to form ammonia in the ammonia forming installation. Small quantities of ammonia generated in the ammonia synthesis reaction are directed to the Solvay process for makeup purposes. Heat from within the system is also directed to the Solvay process subsystem wherein sodium carbonate, sodium bicarbonate and calcium chloride are produced.

The distilled water produced in the brine concentration subsystem is generally of lower salt content than is necessary or preferred to most human tastes. Also, to a lesser degree, the product water of the electrodialysis subsystem, in some embodiments, is of lower salt content than is necessary. Accordingly, provision is made for blending the product waters (a) and (c) and (e); thus, some of the reverse osmosis subsystem product contains more salt (for example, somewhat above 500 ppm) than the target concentration, and thus less equipment, less energy and less cost are required per unit of blended product water of the desired characteristics.

The by-products subsystems produce marketable products of value thereby permitting productive use of the brine, eliminating or reducing that disposal cost and also spreading the capital and operating cost of the total process over a greater number and quantity of marketable products.

Thermal energy is generated to drive conventional steam turbines which provide mechanical energy for the process including mechanical energy to drive pumps and compressors and to drive an electric generator to provide the electricity used in the process and electricity to be distributed and used outside the boundary of the process. After the high-pressure steam has been employed to drive the steam turbine, a portion of the heat thereafter left in the used steam is beneficially applied as process heat in the by-product subsystems. Further, a hydraulic energy recovery turbine recovers hydraulic power in the form of mechanical energy from the reject fluid from the reverse osmosis units and that mechanical energy is directed to help drive a reverse osmosis pump and/or to drive an electric generator to produce electric power, portions of which may be applied to help drive the electrodialysis units, the brine electrolysis subsystem and other needs of the process.

DESCRIPTION OF THE DRAWINGS

The invention will be better understood when the following drawings are considered with the detailed description of the preferred embodiment.

FIG. 1A is a drawing of a system of the preferred embodiment of the invention depicting the electrodialysis and reverse osmosis portion of the process.

DESCRIPTION OF THE PREFERRED EMBODIMENT

Figure 1B:
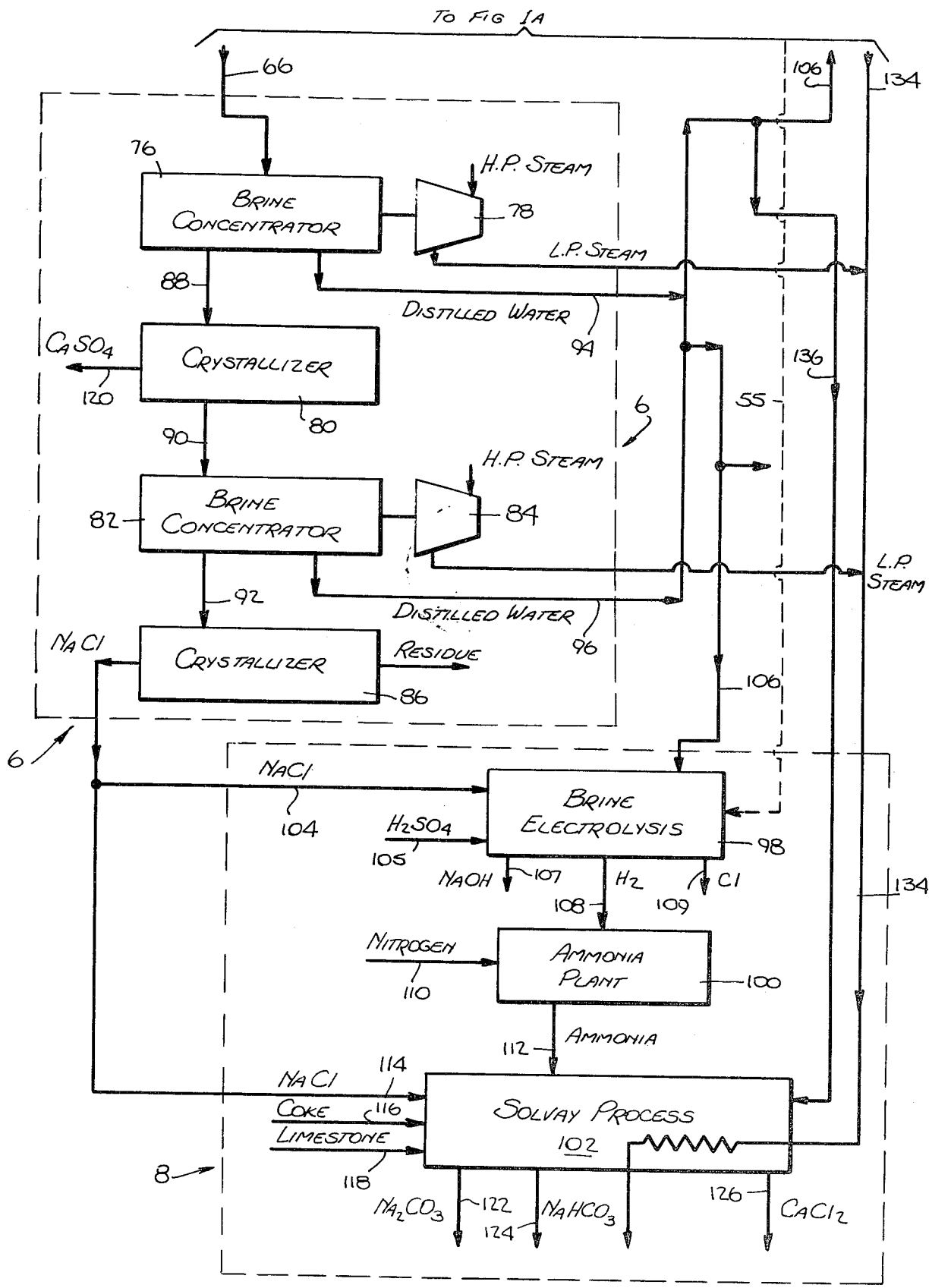
FIG. 1B is a drawing of the preferred embodiment of the brine concentrator, the ammonia forming subsystem and Solvay process subsystem of the process.

The desalination system as shown in the preferred embodiment is directed to maximizing recovery of usable product water from essentially the full spectrum of saline water; i.e. 500 ppm to 36,000 ppm and to obtaining valuable by-products recovery when consuming a fixed amount of energy. The desalination system of the preferred embodiment consists essentially of an electrodialysis subsystem 2, a reverse osmosis subsystem 4, a brine concentration subsystem 6, by-products subsystem 8 and product water blending 10. An energy source such as a high-pressure steam turbine generator system is afforded to provide electricity, mechanical energy and thermal energy for the system.

The system includes facilities for pretreating the saline water entering the system regardless of the salt content. Brackish water pretreatment facilities consist of a pretreatment unit 12 and a feed water monitoring unit 14. The sea water pretreatment facilities include a similar pretreatment unit 16 and feed water monitoring unit 18. Lines 20, 21 and 22 are provided to deliver the saline water of various salt content to and through the pretreatment units.

Illustrative of the pretreatment processes available are shock chlorination, coagulation, screening filtration with sand followed by diatomaceous earth, carbon filtration to remove chlorine and pH adjustment. The solids and other matter separated from the water by the pretreatment units are discharged through the various lines 24.

The system is provided with lines 26, 27 and 28 to deliver the saline water of various salt content to the particular desalination equipment best suited to begin the treatment.

The electrodialysis subsystem 2 is comprised of an electrodialysis installation 30 including the electrodialysis unit 31, a DC generator 32 which powers the electrodialysis unit 31, a turbine 34 to drive the generator 32, heat exchanger subsystem 33 and storage facilities 36. Lines 38 and 40 are provided to remove product water and saline water from the electrodialysis subsystem 2. The electrodialysis unit 31 is run at 21° to 93° C. (70° to 190° F.) Typically, an electrodialysis unit 30, such as an Ionics, Inc. electrodialysis unit when processing a dilute stream will have a blowdown rate of 20% of feed rate which means that for a module producing 350,000 gallons per day of product water, the blowdown rate is 87,500 gallons per day (3000-7500 ppm) and the total feed rate to the module is 437,500 gallons per day. An electrodialysis unit 30 suitable for use within the system is described in U.S. Pat. No. 3,075,908 (Kollsman) issued Jan. 29, 1963. The system includes heat exchanger units and control devices which together permit (a) preheating to a predetermined controlled temperature the brackish water to be processed in the electrodialysis cells, (b) delivering fluid (product water) of lower saline content than that received by the electrodialysis system, and (c) delivering a more concentrated fluid at a predetermined controlled temperature to a further desalination equipment. Heat is developed during the electrodialysis process and the ion exchange material in an electrodialysis apparatus can be maintained in a state of controlled reduced electrical conductivity by controlling the cooling effect upon the ion exchange material of the liquid which flows past it. In the preferred embodiment, the ion exchange material is cooled to a limited extent, so that under the flow of the electric current to which the material is subjected the temperature of the ion exchange material is maintained sufficiently high, for example 82° C. (180° F.) to 93° C. (190° F.), to result in a substantial reduction of the electrical resistivity, but not so high that the resistivity of the apparatus is increased by boiling of the liquid or formation of vapor within the ion exchange material. Alternatively, the saline fluid may be at a lower temperature such as for example 70° F.

The product water and reject from the electrodialysis unit 30 flow through a heat exchanger 33 within the subsystem where heat is advantageously recovered from the product water, which product water is thereafter directed by line 38 to the product water blending gallery 10.

The reverse osmosis subsystem 4 is comprised of a first reverse osmosis subsystem 42, a second reverse osmosis subsystem 44, a pump 46-turbine 48 drive for the reverse osmosis subsystem 42 and a pump 50-turbine 52 hydraulic power recovery turbine 54 drive for the reverse osmosis subsystem 44. The subsystem also includes electric generator 53 driven by hydraulic power recovery turbine 54 to produce electric power to help drive hydraulic power recovery turbine 54 to produce electric power to help drive through line 55, the electrodialysis unit 31 and the brine electrolysis unit 98. Subsystem 42 also includes a heat exchanger condenser 70 to elevate the temperature of the water entering the subsystem 42. Line 27 is provided to deliver moderately brackish water from both outside the system and from the electrodialysis unit 31 via line 40 to the moderate-pressure reverse osmosis subsystem 42. Line 58 delivers water from pump 46 through the reverse osmosis moderate-pressure subsystem 42.

The moderate-pressure reverse osmosis subsystem 42 of the reverse osmosis system 4 is conventional such as duPont PERMASEP B-9 Permeators. A B-9 Permeator has a hollow fiber membrane configuration, has a shell dimension of $9\frac{1}{2}$ inches OD × $8\frac{1}{2}$ inches ID × 48 inches long and a shell material of filament-wound fiberglass epoxy. Thus, for example, with brackish water of 5,000 ppm salt at 80° to 95° F. and at pressures of 400 psig, conversion is effected of approximately 50% to 60% of the brackish water to fresh product water having a salt content of 300 to 500 ppm which is removed from the system by line 62. The remaining 40% to 50% of the water, sometimes called reject water, carries most of the salt in a saline fluid for further processing through line 60.

In practice, when relatively brackish water is the feed, to obtain the desired conversion water, Permeators in the reverse osmosis subsystem 42 are piped to operate in two or more stages or series. Thus, within the moderate-pressure reverse osmosis subsystem 42, a series operation is used. In the series operation, reject from the first stage of the subsystem is fed directly into a second stage of the first subsystem. The product from both stages of the first subsystem is then combined.

In the preferred embodiment of the system of the present invention, the product water is taken from the first reverse osmosis subsystem 42 through line 62 and ultimately either used without further treatment or blended with product water from other units of the system. The reject water is of higher salt content than the water entering the moderate-pressure reverse osmosis subsystem 42 and is pumped through line 60 by pump 50 to a high-pressure reverse osmosis subsystem 44. The temperature of the reject water is in the range of 80° to 95° F., having been previously heated to that temperature while in the electrodialysis subsystem 2 or by condenser 70 while in line 27 prior to entering the moderate-pressure reverse osmosis system 42.

The high-pressure reverse osmosis subsystem 44 is a high-pressure reverse osmosis subsystem having duPont PERMASEP B-10 membrane. A reverse osmosis process virtually the same as previously described is repeated in reverse osmosis system 44 at a pressure in the range of 800 psig. Steam at 1,000 to 2,300 psia and approximately 1,200° F. or at approximately 400 to 1000 psia and approximately 900° F. drives turbine 52. The high-pressure reverse osmosis subsystem 44 is piped to operate in two or more stages or series. Line 28 is provided to deliver water from both outside the system and the high-salt content discharge from the reverse osmosis moderate-pressure subsystem 42 via line 60 through pump 50 to the high-pressure reverse osmosis subsystem 44. Water from outside the system is passed through heat exchanger-condenser 71 before delivery to pump 50. Product water is taken from the subsystem through line 64 to be blended or recycled via line 68 to the electrodialysis subsystem 30 and via line 69 to the moderate-pressure reverse osmosis subsystem modules. A high percentage of the salts are rejected by the membrane and such salts are concentrated in a reject brine which flows along the outside of the bundle of membranes and then exits from the Permeator through line 66. Approximately 30% of the water entering the reverse osmosis subsystem 44 is converted to product water having 400 to 700 ppm of salt.

Hydraulic power recovery turbine 54 is provided to recover power from the brine discharge from the high-pressure reverse osmosis subsystem 44. The power recovered in turbine 54 contributes to the drive of pump 50 and to drive electric generator 53. Line 66 is provided to deliver the high-salt content discharge from the high-pressure reverse osmosis subsystem 44 to downstream equipment.

A product water blending gallery 10 is provided to afford selective blending of product water from each desalination subsystem and product water from the brine concentrator subsystem 6.

The brine concentrator subsystem 6, seen in FIG. 2, is comprised of a brine concentrator 76, a high-pressure steam turbine 78 to drive the brine concentrator 76, a crystallizer 80, a brine concentrator 82, a high-pressure steam turbine 84 to drive brine concentrator 82 and a crystallizer 86. Lines 88, 90 and 92 deliver discharge through the brine concentration unit and lines 94 and 96 take distilled water from brine concentrators 76, 82 respectively. The brine concentrators 76 and 82 are conventional, such as Resources conservation Company R.C.C. 225T which is a vapor-compression evaporative system capable of taking brines into a slurry without scaling and include a feed tank, heat exchanger, gas stripper and a compressor, none of which are shown. The brine to be treated is initially fed into a feed tank for a five to ten minute residence time for acid treatment. The acidified feed is then pumped through a heat exchanger which raises the temperature of the incoming flow to the boiling point. After the water passes through a noncondensible gas stripper, the brine enters the evaporator sump. Brine from the sump is pumped to the top of the heat-transfer tubes where it is released to fall as a film inside of the tubes. A portion of this falling film is vaporized. The vapor is then compressed in a vapor-compression thermodynamic cycle, and introduced to the shell side of the tube bundle where the temperature differential between the vapor and the brine film causes the vapor to condense as pure water. The concentrated brine slurry is continuously withdrawn from the sump at a sulfate stage of concentration to recover sulfate and finally withdrawn for further dehydration.

Distilled water is taken from the first brine concentrator 76 through line 94 while the high-salt content water is passed through line 88 for further treatment to recover additional distilled water, calcium sulfate and sodium chloride. The calcium sulfate is initially removed from the high-salt content water in the crystallizer 80.

Brine or reject from the crystallizer 80 is directed through line 90 to a second brine concentrator which is similar in design to the brine concentrator 76. Again, distilled water is recovered from the brine concentrator 76 and taken through line 96. In the process of this invention approximately 90% of the water entering the brine concentrator system 6 through line 66 is eventually recovered as distilled water through lines 94 and 96. The distilled water from lines 94 and 96 is delivered to a common distilled water line 106.

The by-product subsystem 8 is comprised of a brine electrolysis unit 98, an ammonia plant 100 and a Solvay process unit 102.

The brine electrolysis unit 98 is provided with sulfuric acid from a source outside the system through line 105.

Sodium chloride from the crystallizer 86 and distilled water from line 106 are combined in the electrolysis unit 98 to provide a salt water solution particularly well suited for electrolysis. The Hooker Chlor-Alkali Systems using Hooker diaphragm cells use as raw materials:

salt: 1.76 short tons/short ton $Cl_2$
98% $H_2SO_4$: 13 lbs/short ton $Cl_2$ and employ a cell liquor composition of:

160.0: grams of caustic per liter
1.16: salt/caustic ratio
0.01: sodium chlorate %
185.6: grams of NaCl per liter In the electrolysis unit 98 hydrogen, line 108, and chlorine, line 109, and sodium hydroxide, line 107, are recovered as products. The electricity to run the electrolysis unit 98 is electricity provided by a generator (not shown) which is driven by high-pressure steam delivered to a generator turbine from steam line 132. Steam at 1,000 to 2,300 psia and approximately 1,200° F. drives the electric generator. Hydrogen from the brine electrolysis unit 98 and nitrogen are delivered to the ammonia plant 100 through lines 108 and 110 respectively.

Ammonia is formed in the system in a conventional commercial ammonia plant 100 employing the Haber process. The reaction occurring in the ammonia plant 100 is a direct reaction of nitrogen and hydrogen at elevated pressures and temperatures in the presence of catalysts.

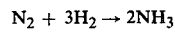

$$N_2 + 3H_2 \rightarrow 2NH_3$$

Sodium chloride from within the system and ammonia (for makeup) from within the system along with coke, as required, and calcium carbonate (i.e. limestone) are delivered to the Solvay process unit 102 through lines 112, 114, 116 and 118 respectively. System distilled water is delivered to the Solvay process unit 102 through line 136 and low-pressure steam discharged from system turbines 48, 52, 79 and 84 is delivered through line 134 to run the unit 102. The Solvay process unit 102 is conventional and is described in "Chemical Technology, and Encyclopedic Treatment" Volume 1, pages 451 to 454. The Solvay process unit 102 produces sodium carbonate 122, sodium bicarbonate 124 and calcium chloride 126.

Thus, by-product in the form of calcium sulfate is taken from the system at the crystallizer 80 through line 120, sodium chloride is taken from crystallizer 86, chlorine and sodium hydroxide are taken from brine electrolysis unit 98 and sodium carbonate, sodium bicarbonate and calcium chloride are taken from the Solvay unit 102 through lines 122, 124 and 126 respectively.

The energy for the system is provided by a boiler 130 which may be fired by any conventional fuel, including hydrogen from the system. The boiler heats water to a temperature of approximately 1,200° F. and a pressure in the range of 1,000 to 2,300 psia. The high-pressure steam is passed through line 132 to all of the high-pressure steam turbines. The steam leaving the turbines 48 and 52 is low-pressure steam of about 270° F. and about 25 psig which is taken through line 134 as steam for the Solvay process unit 102.

Low-pressure steam from the turbines is passed through the condensers 70 and 71 in heat exchange relationship with saline water to provide the heat necessary to effect preheating of a portion of the saline feed to the reverse osmosis units 42 and 44.

It is known that saline water conditions vary from location to location and that at many potential sites of desalting facilities, the saline water content changes from time to time due to weather and tidal conditions. Thus, persons conversant with desalination will recognize the advantages of the operating flexibility of the process of the present invention as set forth in the following process illustrations.

Fluid "A" — When Starting with a Fluid Such as Slightly Brackish Water

When the feed saline water is slightly brackish water (500 ppm up to 3000 ppm salt), the water is pretreated and delivered to the electrodialysis unit 30. In the electrodialysis unit 31 the slightly brackish water can be desalinated using DC electrical energy. Typically, product water of less than 500 ppm salt will be produced from the slightly brackish water and passed through product water line 38. The reject stream from the electrodialysis unit 31 will be essentially moderately brackish water typically having approximately 3,500 ppm salt and will be passed through line 40 into the first reverse osmosis subsystem 42. The moderately brackish water is pumped through the first reverse osmosis subsystem 42 at 400 psig and product water having less than 500 ppm salt will be produced and passed through line 62 to the blending gallery 10, thus, leaving very brackish water for further processing in the high-pressure reverse osmosis subsystem 44. The high-pressure reverse osmosis subsystem 44 pumps the very brackish water through the reverse osmosis units in the subsystem 44 at 800 psig and produces product water that may be above or below the 500 ppm salt target line, depending on various operating conditions. A portion of the product water that is above 500 ppm is recycled to the electrodialysis unit 30 through line 68; another portion is delivered through line 69 to the moderate-pressure reverse osmosis subsystem 42.

The reject brine from the second reverse osmosis subsystem 44 is passed to the brine concentrator system 6 for recovery of distilled water and by-product recovery.

Treatment of Moderately Brackish Water

If moderately brackish water (3000 ppm up to 7500 ppm salt) is the saline feed water to be desalinated, the initial desalination step is moderate-pressure reverse osmosis. The moderately brackish water to be desalinated is delivered to the moderate-pressure reverse osmosis subsystem 42 at 400 psig. Therein product water at less than 500 ppm salt is delivered to the blending gallery 10 through line 62 and very brackish water is delivered through line 60 to the high-pressure reverse osmosis subsystem 44 at 800 psig. Therein, product water at above and/or below 500 ppm salt is produced and then delivered through line 64 to the blending gallery 10 and a portion of the product water of above 500 ppm salt is recycled to the electrodialysis unit 30.

Product water containing less than 500 ppm salt is produced in the electrodialysis unit 30 and delivered through line 38 to the blending gallery 10 while moderately brackish water is delivered to the moderate-pressure reverse osmosis subsystem 42.

Treatment of Very Brackish Water or Sea Water

When very brackish water (above 7500 ppm salt) or sea water (typically 34,000 to 36,000 ppm) is desalinated, the processing begins in the high-pressure reverse osmosis subsystem 44. The very brackish water is initially pretreated and delivered to the reverse osmosis subsystem 44 at 800 psig, producing product water at above and/or below 500 ppm salt which is delivered through line 64 to the blending gallery 10 and a portion of the water above 500 ppm salt is recycled to the electrodialysis unit 30 for further processing. The slightly brackish water delivered to the electrodialysis unit 30 is converted to product water having less than 500 ppm salt which is delivered through line 38 to the blending gallery 10 with the remaining moderately brackish water having over 3,000 ppm salt being delivered through line 40 to the moderate pressure reverse osmosis subsystem 42 at 400 psig. Therein product water having less than 500 ppm salt is delivered through line 62 to the blending gallery 10 and the remaining very brackish water is delivered to the high-pressure reverse osmosis subsystem 44.

In every desalination example described above, the brine discharge from the high-pressure reverse osmosis subsystem 44 is delivered to the brine concentration unit 6. Illustratively, the brine discharged through line 66 is first passed through a hydraulic power recovery turbine where mechanical energy is recovered. The brine is delivered to the brine concentration unit 6 where distilled water at nominal ppm salt is produced and calcium sulfate and sodium chloride are produced. The distilled water is delivered to the blending gallery 10 and to the brine electrodialysis unit 98. Sodium chloride (1830 kg. per metric ton of chlorine) from the system and relatively small quantities of sodium carbonate (29 kg. per metric ton of chlorine) and sulfuric acid (sp. gr. 1.84 quantity 10 kg. per metric ton of chlorine) are also delivered to the brine electrodialysis unit 98 for the conventional chlorine/sodium hydroxide/hydrogen production process. The hydrogen is delivered to the ammonia plant 100 with nitrogen in a 3:1 ratio to produce ammonia. Ammonia for make up is delivered through line 112 to the Solvay process unit 102. Sodium chloride, coke as required and limestone are delivered to the Solvay process. Distilled water is delivered from the brine concentrators 76 and 82 to the Solvay process unit 102 and low-pressure steam is provided for the Solvay process unit 102 from the turbine discharge line 134. Within the Solvay process unit, sodium carbonate, sodium bicarbonate and calcium chloride are produced in the conventional manner.

It is, of course, within the scope of the process of the invention to process any combination of saline water concomitantly. Any combination of brackish water, moderately brackish water, very brackish water or sea water can be processed at the same time with the only limitation being the capacity of the equipment.

The apparatus and process inventions provide many advantages over the single system desalination processes. The apparatus facilitates the use of a variety of specific processes which are particularly suitable for saline water of different salt content. This characteristic is particularly beneficial since it is well known that saline water conditions vary from location to location and that at many potential sites of desalting facilities, the saline water content changes from time to time due to weather and tidal conditions.

Another advantage is that the apparatus of the invention can be constructed at a lower capital cost per unit of product water than present facilities which rely on a single process for desalination. Further, these apparatus and processes are operated at lower cost per unit of product than conventional single unit process.

It is also significant that more product water is produced per unit of saline water entering the system than conventional electrodialysis or conventional reverse osmosis systems. This characteristic provides for less reject per unit of product water and, thus, minimizes disposal costs. Correlatively, less saline water must be pretreated to obtain a unit of product, thus, pretreatment costs are also reduced.

I claim:

1. A process for the purification and desalination of water containing from 500 ppm to 36,000 ppm salt comprising the steps of:
    (a) selecting the water containing 500 ppm to 3,000 ppm salt;
    (b) delivering the water containing 500 ppm to 3,000 ppm salt to an electrodialysis unit;
    (c) producing product water containing less than 500 ppm and reject in the electrodialysis unit;
    (d) selecting the water containing 3,000 ppm to 7,500 ppm salt;
    (e) delivering the water containing 3,000 ppm to 7,500 ppm salt and the reject from the electrodialysis unit to a moderate pressure reverse osmosis unit;
    (f) producing product water containing less than 500 ppm and reject in the moderate pressure reverse osmosis unit;
    (g) selecting the water containing 7,500 ppm to 36,000 ppm salt;
    (h) delivering the water containing 7,500 ppm to 36,000 ppm salt and the reject from the moderate pressure reverse osmosis unit to a high-pressure reverse osmosis unit;
    (i) producing product water containing 300 ppm to 800 ppm and reject in the high-pressure reverse osmosis unit; and
    (j) blending the product water from the electrodialysis unit, product water from the moderate-pressure reverse osmosis unit and product water from the high-pressure reverse osmosis unit.

2. A process as in claim 1 wherein the water blended from the various product water components is less than 500 ppm salt.

3. A process as in claim 1 wherein above 500 ppm product water from the high-pressure reverse osmosis unit is recycled to the electrodialysis unit for further desalination.

4. A process as in claim 1 further comprising the step of delivering reject brine which has a higher salt content than sea water to a brine concentrator.

* * * * *